(12) United States Patent
Nakano

(10) Patent No.: US 8,586,674 B2
(45) Date of Patent: Nov. 19, 2013

(54) COPOLYMER RUBBER COMPOSITION, MOLDED PRODUCT, AND AUTOMOTIVE SEALANT

(75) Inventor: Sadayuki Nakano, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/452,101

(22) Filed: Apr. 20, 2012

(65) Prior Publication Data

US 2012/0202947 A1 Aug. 9, 2012

Related U.S. Application Data

(63) Continuation of application No. 12/712,839, filed on Feb. 25, 2010.

(30) Foreign Application Priority Data

Feb. 27, 2009 (JP) ................................. 2009-045612

(51) Int. Cl.
*C08F 8/00* (2006.01)
*C08L 9/00* (2006.01)
*C08L 23/00* (2006.01)
*C08L 47/00* (2006.01)

(52) U.S. Cl.
USPC ............................. 525/191; 525/232; 525/240

(58) Field of Classification Search
USPC ......................................... 525/191, 232, 240
See application file for complete search history.

(56) References Cited

U.S. PATENT DOCUMENTS

| | | | |
|---|---|---|---|
| 4,895,903 A | 1/1990 | Kobayashi et al. | |
| 5,162,441 A | 11/1992 | Nakata et al. | |
| 5,317,036 A * | 5/1994 | Brady et al. | 523/223 |
| 5,691,413 A | 11/1997 | Morikawa et al. | |
| 5,710,218 A | 1/1998 | Nakahama et al. | |
| 6,410,650 B1 | 6/2002 | Koda et al. | |
| 2010/0222515 A1 | 9/2010 | Nakano | |

FOREIGN PATENT DOCUMENTS

| | | |
|---|---|---|
| CN | 1310730 A | 8/2001 |
| JP | 55036251 A1 | 3/1980 |
| JP | H08151488 A | 6/1996 |
| JP | H08157652 A | 6/1996 |
| JP | H08283479 A | 10/1996 |
| JP | 10-195259 A | 7/1998 |
| JP | 2000-344980 A | 12/2000 |
| JP | 2002160327 | 6/2002 |
| WO | 0059962 A1 | 10/2000 |

OTHER PUBLICATIONS

U.S. Non-Final Office Action issued in U.S. Appl. No. 12/711,754 dated May 10, 2011.
Non-Final Office Action issued in related U.S. Appl. No. 13/293,811 dated Nov. 15, 2012.
Chinese Office Action issued in Application No. 201010126348.7 dated Jul. 4, 2012.
Chinese Office Action issued in application no. 201010126371.6 dated Jul. 4, 2012.
U.S. Non-Final Office Action issued in U.S. Appl. No. 13/293,811 dated Aug. 8, 2012.
State Intellectual Property Office of People's Republic of China, "The Second Office Action," issued in connection with Chinese Patent Application No. 201010126371.6, dated Mar. 5, 2013.
Japanese Patent Office, "Notice of Reasons for Rejection," issued in connection with Japanese Patent Application No. 2010-039986, dated Jun. 11, 2013 English language Translation.

* cited by examiner

*Primary Examiner* — Irina S Zemel
*Assistant Examiner* — Jeffrey Lenihan
(74) *Attorney, Agent, or Firm* — Sughrue Mion, PLLC

(57) ABSTRACT

The copolymer rubber composition comprises 60 to 75% by weight of a copolymer rubber (1) and 40 to 25% by weight of a copolymer rubber (2), and exhibits a difference in iodine value of 5 to 30 between the copolymer rubber (1) and the copolymer rubber (2). The copolymer rubber (1) is an ethylene-α-olefin-nonconjugated polyene copolymer rubber having an ethylene unit of 50 mol % to 70 mol %, an α-olefin unit of 50 mol % to 30 mol %, and an iodine value of 10 to 30, and the copolymer rubber (2) is an ethylene-α-olefinic copolymer rubber having an ethylene unit of more than 70 mol % and 95 mol % or less, an α-olefin unit of less than 30 mol % and 5 mol % or more, and an iodine value of 0 to 8.

8 Claims, No Drawings

COPOLYMER RUBBER COMPOSITION, MOLDED PRODUCT, AND AUTOMOTIVE SEALANT

This is a Continuation of U.S. patent application Ser. No. 12/712,839, filed Feb. 25, 2010, which claims priority based on JP 2009-045612, filed on Feb. 27, 2009The entire disclosures of the prior applications are considered part of the disclosure of the accompanying divisional application, and are hereby incorporated by reference.

BACKGROUND OF THE INVENTION

1. Field of the Invention

The present invention relates to a copolymer rubber composition, a molded product, and an automotive sealant.

2. Related Background Art

For automobiles, sealants sealing between car body opening peripheries, and opening/closing members for openings such as doors and trunk lids are used to prevent rain, wind and sounds from the outside. The sealants commonly include a solid member attached to door frames, trunk lids, car body opening peripheries and the like, and a sponge member to seal gaps between car body opening peripheries, and opening/closing members for openings.

The solid member is required to have physical properties such as low compression set and high strength, and a non-foamed material or a slightly foamed material obtained by vulcanizing an ethylene-α-olefin copolymer rubber is generally used for the solid member.

For example, Japanese Patent Application Laid-Open No. 2002-160327 proposes a solid member obtained by vulcanizing and foaming a composition of: an ethylene-propylene-nonconjugated diene copolymer rubber having a low ethylene unit amount and a low iodine value; and an ethylene-1-butene-noncojugated diene copolymer rubber having a high ethylene unit amount and a high iodine value.

SUMMARY OF THE INVENTION

However, conventional solid members obtained by vulcanizing ethylene-α-olefin-nonconjugated diene copolymer rubbers are still not sufficiently satisfactory in compression set and strength.

Under such a situation, an object of the present invention is to solve is to provide a copolymer rubber composition which can provide a crosslinked molded product having a low compression set and a high strength, a molded product obtained by crosslinking the copolymer rubber composition, and an automotive sealant having the molded product as a solid member.

A first aspect of the present invention is a copolymer rubber composition comprising a copolymer rubber (1), and a copolymer rubber (2) as a rubber component, wherein the content of the copolymer rubber (1) is 60% by weight or more and 75% by weight or less, and the content of the copolymer rubber (2) is 40% by weight or less and 25% by weight or more, based on 100% by weight of the total of the copolymer rubber (1) and the copolymer rubber (2); and the difference in iodine value between the copolymer rubber (1) and the copolymer rubber (2) is 5 or more and 30 or less.

The copolymer rubber (1): an ethylene-α-olefin-nonconjugated polyene copolymer rubber wherein the content of a monomer unit based on ethylene is 50 mol % or more and 70 mol % or less; the content of a monomer unit based on α-olefin is 50 mol % or less and 30 mol % or more (here, the total of the monomer unit based on ethylene and the monomer unit based on α-olefin is 100 mol %); and the iodine value is 10 or more and 30 or less.

The copolymer rubber (2): an ethylene-α-olefinic copolymer rubber wherein the content of a monomer unit based on ethylene is more than 70 mol % and 95 mol % or less; the content of a monomer unit based on α-olefin is less than 30 mol % and 5 mol % or more (here, the total of the monomer unit based on ethylene and the monomer unit based on α-olefin is 100 mol %); and the iodine value is 0 or more and 8 or less.

A second aspect of the present invention is a molded product obtained by vulcanizing the copolymer rubber composition.

A third aspect of the present invention is an automotive sealant having the molded product as a solid member.

The present invention can provide a copolymer rubber composition which can provide a crosslinked molded product having a low compression set and a high strength, a molded product obtained by crosslinking the copolymer rubber composition, and an automotive sealant having the molded product as a solid member.

DESCRIPTION OF THE PREFERRED EMBODIMENTS

A copolymer rubber composition used in the present invention comprises a copolymer rubber (1), and a copolymer rubber (2) as a rubber component.

The copolymer rubber (1): an ethylene-α-olefin-nonconjugated polyene copolymer rubber wherein the content of a monomer unit based on ethylene is 50 mol % or more and 70 mol % or less; the content of a monomer unit based on α-olefin is 50 mol % or less and 30 mol % or more (here, the total of the monomer unit based on ethylene and the monomer unit based on α-olefin is 100 mol %); and the iodine value is 10 or more and 30 or less.

The copolymer rubber (2): an ethylene-α-olefinic copolymer rubber wherein the content of a monomer unit based on ethylene is more than 70 mol % and 95 mol % or less; the content of a monomer unit based on α-olefin is less than 30 mol % and 5 mol % or more (here, the total of the monomer unit based on ethylene and the monomer unit based on α-olefin is 100 mol %); and the iodine value is 0 or more and 8 or less.

α-Olefins of the copolymer rubber (1) and the copolymer rubber (2) are preferably α-olefins having 3 to 20 carbon atoms, and include straight chain α-olefins such as propylene, 1-butene, 1-pentene, 1-hexene, 1-heptene, 1-octene, 1-nonene and 1-decene, and branched α-olefins such as 3-methyl-1-butene, 3-methyl-1-pentene and 4-methyl-1-pentene. These may be used singly or concurrently in two or more. The α-olefins are preferably propylene and 1-butene, and more preferably propylene.

Examples of the nonconjugated polyenes for the copolymer rubber (1) and the copolymer rubber (2) include chain nonconjugated dienes such as 1,4-hexadiene, 1,6-octadiene, 2-methyl-1,5-hexadiene and 6-methyl-1,5-heptadiene and 7-methyl-1,6-octadiene; cyclic nonconjugated dienes such as cyclohexadiene, dicyclopentadiene, methyltetraindene, 5-vinyl-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(5-heptenyl)-2-norbornene, 5-(7-octenyl)-2-norbornene, 5-methylene-2-norbornene, 5-ethylidene-2-norbornene and 6-chloromethyl-5-isopropenyl-2-norbornene; and trienes such as 2,3-diisopropylidene-5-norbornene, 2-ethylidene-3-isopropylidene-5-norbornene, 2-propenyl-2,2-norbornadiene, 1,3,7-octatriene, 1,4,9-decatriene, 6,10-dimethyl-1,5,9-undecatriene, 5,9-dimethyl-1,4,8-decatriene, 4-ethylidene-8-methyl-1,7-nonadiene, 13-ethyl-9-methyl-1,9,12-pentadecatriene, 8,14,16-trimethyl-1,7,14-hexadecatriene and 4-ethylidene-12-methyl-1,11-pentadecadiene. These may be used singly or concurrently in two or more. The nonconjugated polyene is preferably at least one compound selected from the nonconjugated polyene group consisting of 5-ethylidene-2-norbornene, dicyclopentadiene and 5-vinyl-2-norbornene.

Examples of the ethylene-α-olefin-nonconjugated polyene copolymer rubbers as the copolymer rubber (1) include, ethylene-propylene-5-ethylidene-2-norbornene copolymer rubbers, ethylene-propylene-dicyclopentadiene copolymer rubbers, ethylene-propylene-5-vinyl-2-norbornene copolymer rubbers, ethylene-1-butene-5-ethylidene-2-norbornene copolymer rubbers, ethylene-1-butene-dicyclopentadiene copolymer rubbers and ethylene-1-butene-5-vinyl-2-norbornene copolymer rubbers.

In the copolymer rubber (1), the content of a monomer unit based on ethylene (ethylene unit) is 50 mol % or more and 70 mol % or less, and the content of a monomer unit based on α-olefin (α-olefin unit) is 50 mol % or less and 30 mol % or more. In order to reduce the compression set and enhance the strength, preferably, the content of an ethylene unit is 55 mol % or more and 68 mol % or less, and the content of an α-olefin unit is 45 mol % or less and 32 mol % or more; and more preferably, the content of an ethylene unit is 60 mol % or more and 68 mol % or less, and the content of an α-olefin unit is 40 mol % or less and 32 mol % or more. Here, the total of the content of the ethylene unit and the content of the α-olefin unit is 100 mol %.

The iodine value (g/100 g polymer) of the copolymer rubber (1) is 10 or more and 30 or less. In order to enhance the weather resistance, the iodine value is preferably 10 or more and 25 or less, and more preferably 10 or more and 20 or less.

Examples of the ethylene-α-olefinic copolymer rubbers as the copolymer rubber (2) include ethylene-α-olefin copolymer rubbers and ethylene-α-olefin-nonconjugated polyene copolymer rubbers. Examples of the ethylene-α-olefin copolymer rubbers include ethylene-propylene copolymer rubbers, ethylene-1-butene copolymer rubbers, ethylene-1-hexene copolymer rubbers, ethylene-1-octene copolymer rubbers, ethylene-propylene-1-butene copolymer rubbers and ethylene-propylene-1-hexene copolymer rubbers. Ethylene-α-olefin-nonconjugated polyene copolymer rubbers include, for example, ethylene-propyrene-5-ethylidene-2-norbornene copolymer rubbers, ethylene-propylene-dicyclopentadiene copolymer rubbers, ethylene-propylene-5-vinyl-2-norbornene copolymer rubbers, ethylene-1-butene-5-ethylidene-2-norbornene copolymer rubbers, ethylene-1-butene-dicyclopentadiene copolymer rubbers and ethylene-1-butene-5-vinyl-2-norbornene copolymer rubbers.

In the copolymer rubber (2), the content of an ethylene unit is more than 70 mol % and 95 mol % or less, and the content of an α-olefin unit is less than 30 mol % and 5 mol % or more. In order to reduce the compression set and enhance the rigidity, preferably, the content of an ethylene unit is 75 mol % or more and 90 mol % or less, and the content of an α-olefin unit is 25 mol % or less and 10 mol % or more; and more preferably, the content of an ethylene unit is 80 mol % or more and 90 mol % or less, and the content of an α-olefin unit is 20 mol % or less and 10 mol % or more. Here, the total of the content of the ethylene unit and the content of the α-olefin unit is 100 mol %.

The iodine value (g/100 g polymer) of the copolymer rubber (2) is 0 or more and 8 or less. In order to enhance the rigidity and the weather resistance, the iodine value is preferably 0 or more and 7 or less, and more preferably 0 or more and 5 or less.

The difference in iodine value between the copolymer rubber (1) and the copolymer rubber (2) is 5 or more and 30 or less. In order to enhance the rigidity, the difference is preferably 7 or more, and more preferably 10 or more. In order to reduce the compression set, the difference is preferably 25 or less, and more preferably 20 or less.

In the copolymer rubber composition, the content of the copolymer rubber (1) is 60% by weight or more and 75% by weight or less, and the content of the copolymer rubber (2) is 40% by weight or less and 25% by weight or more. In order to enhance the rigidity and the kneading processability, preferably, the content of the copolymer rubber (1) is 63% by weight or more and 70% by weight or less, and the content of the copolymer rubber (2) is 37% by weight or less and 30% by weight or more.

In the copolymer rubber composition, the limiting viscosity [η] of a rubber component composed of the copolymer rubber (1) and the copolymer rubber (2) is, in order to enhance the strength and the kneading processability, preferably 1 dl/g or more and 10 dl/g or less, more preferably 1.5 dl/g or more and 8 dl/g or less, and still more preferably 1.8 dl/g or more and 5 dl/g or less. The limiting viscosity [η] is measured in tetralin at 135° C.

In the copolymer rubber composition, the molecular weight distribution (a ratio: Mz/Mn of the Z-average molecular weight (Mz) and the number-average molecular weight (Mn) in terms of polystyrenes) of a rubber component composed of the copolymer rubber (1) and the copolymer rubber (2) is, in order to enhance the strength and the kneading processability, preferably 3 to 7. Further in order to enhance the strength, the molecular weight distribution is preferably unimodal.

Methods for manufacturing a copolymer rubber composition include a method using two tanks coupled in series involving manufacturing one of the copolymer rubber (1) and the copolymer rubber (2) in a first reaction tank, feeding the one copolymer rubber manufactured in the first reaction tank to a second reaction tank, and manufacturing the other copolymer rubber in the second reaction tank in the presence of the one copolymer rubber. For example, the method includes one in which ethylene, an α-olefin, a nonconjugated polyene, a solvent, hydrogen and a polymerization catalyst are fed to a first reaction tank to manufacture one of the copolymer rubber (1) and the copolymer rubber (2) in the first reaction tank; and the one copolymer rubber manufactured in the first reaction tank, ethylene, an α-olefin, a nonconjugated polyene, a solvent, hydrogen and a polymerization catalyst are fed to a second reaction tank to manufacture the other copolymer rubber in the second reaction tank.

Polymerization catalysts used in manufacture of a copolymer rubber (1) are suitably those containing a vanadium compound represented by formula (1) and an organoaluminum compound represented by formula (2) as polymerization catalyst components.

formula (1): $VO(OR)_m X_{3-m}$, wherein R denotes a straight chain hydrocarbon group having 1 to 8 carbon atoms; X denotes a halogen atom; and m denotes a number satisfying $0 \leq m \leq 3$.

formula (2): $R''_j AlX''_{3-j}$ wherein R" denotes a hydrocarbon group; X" denotes a halogen atom; and j denotes a number satisfying $0 < j \leq 3$.

In formula (1), R denotes a straight chain hydrocarbon group having 1 to 8 carbon atoms, and includes, for example, straight chain alkyl groups having 1 to 8 carbon atoms such as a methyl group, an ethyl group, a n-propyl group, a n-butyl group, a n-pentyl group and a n-hexyl group. Preferable are straight chain alkyl groups having 1 to 3 carbon atoms. X denotes a halogen atom, and includes a chlorine atom. m denotes a number satisfying $0 \leq m \leq 3$, and preferably a number satisfying $0 \leq m \leq 2$.

Examples of the vanadium compounds represented by formula (1) include $VOCl_3$, $VO(OCH_3)Cl_2$, $VO(OC_2H_5)Cl_2$, $VO(O(n-C_3H_7))Cl_2$, $VO(O(n-C_4H_9))Cl_2$, $VO(O(n-C_5H_{11}))Cl_2$, $VO(O(n-C_6H_{13}))Cl_2$, $VO(O(n-C_7H_{15}))Cl_2$, $VO(O(n-C_8H_{17}))Cl_2$, $VO(OCH_3)_{0.5}Cl_{2.5}$, $VO(OC_2H_5)_{0.5}Cl_{2.5}$, $VO(O(n-C_3H_7))_{0.5}Cl_{2.5}$, $VO(O(n-C_4H_9))_{0.5}Cl_{2.5}$, $VO(O(n-C_5H_{11}))_{0.5}Cl_{2.5}$, $VO(O(n-C_6H_{13}))_{0.5}Cl_{2.5}$, $VO(O(n-C_7H_{15}))_{0.5}Cl_{2.5}$, $VO(O(n-C_8H_{17}))_{0.5}Cl_{2.5}$, $VO(OCH_3)_{1.5}Cl_{0.5}$, $VO(OC_2H_5)_{1.5}Cl_{0.5}$, $VO(O(n-C_3H_7))_{1.5}Cl_{0.5}$, $VO(O(n-C_4H_9))_{1.5}Cl_{0.5}$, $VO(O(n-C_5H_{11}))_{1.5}Cl_{0.5}$, $VO(O(n-C_6H_{13}))_{1.5}Cl_{0.5}$, $VO(O(n-C_7H_{15}))_{1.5}Cl_{0.5}$, $VO(O(n-C_8H_{17}))_{1.5}Cl_{0.5}$, $VO(OCH_3)_{0.8}Cl_{2.2}$, $VO(OC_2H_5)_{0.8}Cl_{2.2}$, $VO(O(n-C_3H_7))_{0.8}Cl_{2.2}$, $VO(O(n-C_4H_9))_{0.8}Cl_{2.2}$, $VO(O(n-C_5H_{11}))_{0.8}Cl_{2.2}$, $VO(O(n-C_6H_{13}))_{0.8}Cl_{2.2}$, $VO(O(n-C_7H_{15}))_{0.8}Cl_{2.2}$ and $VO(O(n-C_8H_{17}))_{0.8}Cl_{2.2}$. Preferable are $VOCl_3$, $VO(OC_2H_5)Cl_2$, $VO(OC_2H_5)_{0.5}Cl_{2.5}$, $VO(OC_2H_5)_{1.5}Cl_{0.5}$ and $VO(OC_2H_5)_{0.8}Cl_{2.2}$.

The vanadium compound represented by formula (1) is obtained by a method in which $VOX_3$ and ROH are reacted in a predetermined molar ratio. For example, the reaction of $VOCl_3$ and $C_2H_5OH$ is indicated by the following formula.

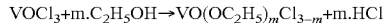

$$VOCl_3 + m.C_2H_5OH \rightarrow VO(OC_2H_5)_m Cl_{3-m} + m.HCl$$

In formula (2), R" denotes a hydrocarbon group, and includes, for example, alkyl groups having 1 to 10 carbon atoms such as a methyl group, an ethyl group, a n-propyl group, an iso-propyl group, a n-butyl group, an iso-butyl group, a pentyl group and a hexyl group. X" denotes a halogen atom, and includes a chlorine atom. j denotes a number satisfying $0<j \leq 3$, and preferably $1 \leq m \leq 2$.

Examples of the organoaluminum compounds represented by formula (2) include $(C_2H_5)_2AlCl$, $(n-C_4H_9)_2AlCl$, $(iso-C_4H_9)_2AlCl$, $(n-C_6H_{13})_2AlCl$, $(n-C_2H_5)_{1.5}AlCl_{1.5}$, $(n-C_4H_9)_{1.5}AlCl_{1.5}$, $(iso-C_4H_9)_{1.5}AlCl_{1.5}$, $(n-C_6H_{13})_{1.5}AlCl_{1.5}$, $C_2H_5AlCl_2$, $(n-C_4H_9)AlCl_2$, $(iso-C_4H_9)AlCl_2$ and $(n-C_6H_{13})AlCl_2$.

Polymerization catalysts used in manufacture of the copolymer rubber (2) are suitably those having a vanadium compound represented by formula (3) shown and the organoaluminum compound represented by formula (2) as polymerization catalyst components.

formula (3): $VO(OR')_n X'_{3-n}$ wherein R' denotes a secondary or tertiary hydrocarbon group having 3 to 8 carbon atoms; X' denotes a halogen atom; and n denotes a number satisfying $0<n \leq 3$.

In formula (3), R' denotes a secondary or tertiary hydrocarbon group having 3 to 8 carbon atoms, and includes, for example, secondary or tertiary alkyl groups having 3 to 8 carbon atoms such as an iso-propyl group, a sec-butyl group and a tert-butyl group. Preferable are secondary or tertiary alkyl groups having 3 to 4 carbon atoms. X' denotes a halogen atom, and includes a chlorine atom. n denotes a number satisfying $0<n \leq 3$, and preferably $0.5<n \leq 2$.

Examples of the vanadium compounds represented by formula (3) include $VO(O(iso-C_3H_7))Cl_2$, $VO(O(iso-C_3H_7))_{0.5}Cl_{2.5}$, $VO(O(iso-C_3H_7))_{1.5}Cl_{0.5}$ and $VO(O(iso-C_3H_7))_{0.8}Cl_{2.2}$. Preferable is $VO(O(iso-C_3H_7))_{0.8}Cl_{2.2}$.

The vanadium compound represented by formula (3) is obtained by a method in which $VOX'_3$ and R'OH are reacted in a predetermined molar ratio. For example, the reaction of $VOCl_3$ and $iso-C_3H_7OH$ is indicated by the following formula.

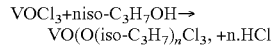

$$VOCl_3 + n\,iso-C_3H_7OH \rightarrow VO(O(iso-C_3H_7))_n Cl_{3} + n.HCl$$

In manufacture of the copolymer rubber (1) and the copolymer rubber (2), the molar ratio of the use amounts of the organoaluminum compound and the vanadium compound (molar number of the organoaluminum compound/molar number of the vanadium compound) is preferably 2.5 to 50.

Solvents usable are inactive solvents including aliphatic hydrocarbons such as propane, butane, isobutane, pentane, hexane, heptane and octane; and alicyclic hydrocarbons including such as cyclopentane and cyclohexane.

The polymerization temperature is ordinarily −20 to 200° C., preferably 0 to 150° C., and more preferably 20 to 120° C. The polymerization pressure is ordinarily 0.1 to 10 MPa, preferably 0.1 to 5 MPa, and more preferably 0.1 to 3 MPa.

The copolymer rubber composition may contain additives, for example, a vulcanizing agent, a vulcanizing coagent, a vulcanizing accelerator, a softening agent, a reinforcing agent, a foaming agent, a foaming coagent, a stabilizer and a deforming agent.

Vulcanizing agents usable are sulfur, sulfur-based compounds, organic peroxides, and the like. Sulfur usable includes powdery sulfur, precipitated sulfur, colloidal sulfur, surface-treated sulfur and insoluble sulfur. The use amount of sulfur and sulfur-based compounds is preferably 0.01 to 10 parts by weight, and more preferably 0.1 to 5 parts by weight, with respect to 100 parts by weight of the rubber component in a copolymer rubber composition.

Examples of the organic peroxides include dicumyl peroxide, 2,5-dimethyl-2,5-di(tert-butylperoxy)hexane, 2,5-dimethyl-2,5-di(benzoylperoxy)hexane, 2,5-dimethyl-2,5-(tert-butylperoxy)hexyne-3, di-tert-butyl peroxide, di-tert-butyl peroxide-3,3,5-trimethylcyclohexane and tert-butyl hydroperoxide. Preferable are dicumyl peroxide, di-tert-butyl peroxide and di-tert-butyl peroxide-3,3,5-trimethylcyclohexane, and more preferable is di-tert-butyl peroxide-3,3,5-trimethylcyclohexane. The use amount of the organic peroxides is preferably 0.1 to 15 parts by weight, and more preferably 1 to 8 parts by weight, with respect to 100 parts by weight of the rubber component in a copolymer rubber composition.

Vulcanizing coagents for sulfur or sulfur-based compounds include metal oxides such as magnesium oxide and zinc oxide. Preferable is zinc oxide. The compounding amount of the vulcanizing coagents is preferably 1 to 20 parts by weight with respect to 100 parts by weight of a rubber component in the copolymer rubber composition.

Examples of the vulcanizing coagents for organic peroxides include triallyl isocyanurate, N,N'-m-phenylene bismaleimide, methacrylic acid, methyl methacrylate, ethyl methacrylate, propyl methacrylate, isopropyl methacrylate, n-butyl methacrylate, i-butyl methacrylate, sec-butyl methacrylate, t-butyl methacrylate, 2-ethylhexyl methacrylate, cyclohexyl methacrylate, isodecyl methacrylate, lauryl methacrylate, tridecyl methacrylate, stearyl methacrylate, 2-hydroxyethyl methacrylate, hydroxypropyl methacrylate, polyethylene glycol monomethacrylate, polypropylene glycol monomethacrylate, 2-ethoxyethyl methacrylate, tetrahydrofurfuryl methacrylate, allyl methacrylate, glycidyl methacrylate, benzyl methacrylate, dimethylaminoethyl methacrylate, diethylaminoethyl methacrylate, methacryloxyethyl phosphate, 1,4-butanediol diacrylate, ethylene glycol dimethacrylate, 1,3-butylene glycol dimethacrylate, neopentyl glycol dimethacrylate, 1,6-hexanediol dimethacrylate, diethylene glycol dimethacrylate, triethylene glycol dimethacrylate, polyethylene glycol dimethacrylate, dipropylene glycol dimethacrylate, polypropylene glycol dimethacrylate, trimethylolethane trimethacrylate, trimethylolpropane trimethacrylate, allyl glycidyl ether, N-methylol methacrylamide, 2,2-bis(4-methacryloxypolyethoxyphenyl)propane, aluminum methacrylate, zinc methacrylate, calcium methacrylate, magnesium methacrylate and 3-chloro-2-hydroxypropyl methacrylate. The compounding amount of the volcanizing coagents is preferably 0.05 to 15 parts by weight, and more preferably 0.1 to 8 parts by weight, with respect to 100 parts by weight of the rubber component in a copolymer rubber composition.

Examples of the vulcanizing accelerators include tetramethylthiuram disulfide, tetraethylthiuram disulfide, tetrabutylthiuram disulfide, dipentamethylenethiuram monosulfide, dipentamethylenethiuram disulfide, dipentamethylenethiuram tetrasulfide, N,N'-dimethyl-N,N'-diphenylthiuram disulfide, N,N'-dioctadecyl-N,N'-diisopropylthiuram disulfide, N-cyclohexyl-2-benzothiazole sulfenamide, N-oxydiethylene-2-benzothiazole sulfenamide, N,N-diisopropyl-2-benzothiazole sulfenamide, 2-mercaptobenzothiazole, 2-(2,4-dinitrophenyl)mercaptobenzothiazole, 2-(2,6-diethyl-4-morpholinothio)benzothiazole, dibenzothiazyl disulfide, diphenylguanidine, triphenylguanidine, diorthotolylguanidine, orthotolylbiguanide, diphenylguanidine phthalate, acetaldehyde-aniline reaction products, butylaldehyde-aniline condensates, hexamethylenetetramine, acetaldehyde ammonia, 2-mercaptoimidazoline, thiocarbanilide, diethylthiourea, dibutylthiourea, trimethylthiourea, diorthotolylthiourea, zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate, tellurium diethyldithiocarbamate, zinc dibutylxanthate and ethylene thiourea. The compounding amount of the vulcanizing accelerators is preferably 0.05 to 20 parts by weight, and more preferably 0.1 to 8 parts by weight, with respect to 100 parts by weight of the rubber component in a copolymer rubber composition.

Examples of the softening agents include petroleum softening agents such as process oil, lubricants, paraffin, liquid paraffin, petroleum asphalt and vaseline; coal tar softening agents such as coal tar and coal tar pitch; fatty oil softening agents such as castor oil, linseed oil, rapeseed oil and coconut oil; waxes such as tall oil, factice, beeswax, carnauba wax and lanolin; fatty acids and fatty acid salts such as ricinoleic acid, palmitic acid, barium stearate, calcium stearate and zinc laurate; and synthetic polymer materials such as petroleum resins, atactic polypropylene and cumarone indene resins. The compounding amount of the softening agents is preferably 1 to 300 parts by weight, more preferably 20 to 250 parts by weight, and still more preferably 50 to 200 parts by weight, with respect to 100 parts by weight of the rubber component in a copolymer rubber composition.

Examples of the reinforcing agents include carbon black, silica, calcium carbonate, micropowder talc and micropowder aluminum silicate. Carbon blacks include SRF, GPF, FEF, MAF, HAF, ISAF, SAF, FT and MT. These carbon blacks may be surface treated with a silane coupling agent. The compounding amount of the reinforcing agents is preferably 1 to 300 parts by weight, more preferably 20 to 250 parts by weight, and still more preferably 50 to 200 parts by weight, with respect to 100 parts by weight of the rubber component in a copolymer rubber composition.

Examples of the foaming agents include inorganic foaming agents such as sodium bicarbonate, sodium carbonate, ammonium bicarbonate, ammonium carbonate and ammonium nitrite; nitroso compounds such as N,N'-dimethyl-N,N'-dinitrosoterephthalamide and N,N'-dinitrosopentamethylenetetramine; azo compounds such as azodicarbonamide, azobisisobutyronitrile, azobiscyclohexylnitrile, azodiaminobenzene and barium azodicarboxylate; sulfonyl hydrazide compounds such as benzenesulfonyl hydrazide, toluenesulfonyl hydrazide, P,P'-oxybis(benzenesulphonyl hydrazide) and diphenylsulfone-3,3'-disulfonyl hydrazide; and azide compounds such as calcium azide, 4,4'-diphenyldisulfonyl azide and p-toluenesulfonyl azide. The compounding amount of the foaming agents is preferably 0.01 to 15 parts by weight, and more preferably 0.05 to 8 parts by weight, with respect to 100 parts by weight of the rubber component in a copolymer rubber composition.

Examples of the foaming coagents include organic acids such as salicylic acid, phthalic acid, stearic acid and oxalic acid; and urea and its derivatives. The compounding amount of the foaming coagents is preferably 0.01 to 15 parts by weight, and more preferably 0.05 to 8 parts by weight, with respect to 100 parts by weight of the rubber component in a copolymer rubber composition.

Examples of the stabilizers include amine antioxidants, hindered phenolic antioxidants and sulfur antioxidants. The compounding amount of the stabilizers is preferably 0.01 to 15 parts by weight, and more preferably 0.05 to 8 parts by weight, with respect to 100 parts by weight of the rubber component in a copolymer rubber composition.

Examples of the defoaming agents include calcium oxide. The compounding amount of the defoaming agents is preferably 0.05 to 20 parts by weight, and more preferably 0.1 to 8 parts by weight, with respect to 100 parts by weight of the rubber component in a copolymer rubber composition.

The copolymer rubber composition may contain resins as required. Examples of the resins include polyethylene resins, polypropylene resins, polybutene, poly-4-methyl-pentene-1, polystyrene, polyester, polyamide and polyphenylene ether. Examples of the polyethylene resins include high-density polyethylene, middle-density polyethylene, low-density polyethylene and straight chain low-density polyethylene.

As methods for compounding the above-mentioned additives to the copolymer rubber composition, well-known preparation methods of rubber compounds can be used. A rubber compound can be prepared, for example, by kneading a softening agent, a reinforcing agent, a stabilizer and the like with a copolymer rubber at a temperature of 80 to 170° C. for 3 to 10 min using an internal mixer such as a Banbury mixer, a kneader or an Intermix, and then, as required, adding a vulcanizing agent, a vulcanizing accelerator, a vulcanizing coagent and the like and kneading the mixture at a temperature of 40 to 80° C. for 5 to 30 min using a roll such as an open roll or a kneader. Thus, a ribbon-shaped or sheet-shaped composition (compounded rubber) is ordinarily obtained. In the case where the kneading temperature in the above-mentioned internal mixer is less than the decomposition temperature of a vulcanizing agent and a foaming agent, the vulcanizing agent and the foaming agent may be simultaneously kneaded.

The copolymer rubber composition is suitably molded into vulcanized molded products, which are used as automobile industry components such as automotive sealants (weather strips, door glass run channels and the like), window frames, radiator hoses, brake components and wiper blades; industrial rubber products such as rubber rolls, belts, packings and hoses; electric insulating materials such as anode caps and grommets; civil engineering and building supplies such as architectural gaskets and construction sheets; rubberized cloth; and the like.

Methods for manufacturing a vulcanized molded product include a method in which a copolymer rubber composition compounded with additives and the like is molded into a molded product having a desired shape by a well-known molding machine (for example, an extruder, a calender roll molding machine, a press molding machine, an injection molding machine and a transfer molding machine), and simultaneously at molding or after molding, the molded product is vulcanized by heating or electron beam irradiation.

In a method of vulcanization by heating, a heating tank and a metal mold having heating means, such as hot air, glass beads fluidized bed, UHF (ultrahigh frequency electromagnetic wave), steam and LCM (hot molten salt bath), can be used. The heating temperature is preferably 150 to 270° C.; and the heating time is preferably 1 to 30 min.

In a method of vulcanization by electron beam irradiation, the energy of the electron beam is preferably 0.1 to 10 MeV, and more preferably 0.3 to 2 MeV. The irradiation is carried out so that the absorbed dose becomes preferably 0.5 to 35 Mrad, and more preferably 0.5 to 10 Mrad.

The vulcanized molded product is suitably used as a solid member of an automotive sealant. The density of the vulcanized molded product used for the solid member is preferably 0.7 to 1.1 kg/L, more preferably 0.7 to 1.0 kg/L, and still more preferably 0.7 to 0.9 kg/L. The hardness (JIS K6253 Type A) of the vulcanized molded product is preferably 30 to 100, more preferably 50 to 90, and still more preferably 60 to 80.

EXAMPLES

Hereinafter, the present invention will be described further in detail by way of Examples and Comparative Examples.

[Methods of Measurements and Evaluations]

(1) The Ethylene Unit Amount and the Propylene Unit Amount

A copolymer rubber and a copolymer rubber composition were each molded into a film of about 0.1 mm in thickness by a hot press machine, and the film was measured for the infrared absorption spectrum by an infrared spectrophotometer (IR-810, made by JASCO Corp.). The ethylene unit amount and the propylene unit amount were determined from the infrared absorption spectrum according to a method described in literature (Takayama, Usami, et al., "Characterization of Polyethylene by Infrared Absorption Spectrum", or Mc Rae, M. A., MadamS, W. F., et al., Die Makromolekulare Chemie, 177, 461 (1976)).

(2) The Iodine Value

A copolymer rubber and a copolymer rubber composition were each molded into a film of about 0.5 mm in thickness by a hot press machine, and the film was measured for the intensity of a peak (absorption peak at 1,688 cm$^{-1}$) originated from 5-ethylidene-2-norbornene by an infrared spectrophotometer. The molar content of double bonds was determined from the peak intensity and the iodine value was calculated from the molar content.

(3) The Molecular Weight Distribution

The Z-average molecular weight (Mz) and the number-average molecular weight (Mn) were measured by gel permeation chromatography (GPC) under the conditions (1) to (9) described below, and the molecular weight distribution (Mz/Mn) was determined.

(1) Apparatus: 150C made by Waters
(2) Separation column: Shodex Packed ColumnA-80M made by Showa Denko K.K.
(3) Measurement temperature: 140° C.
(4) Carrier: ortho dichlorobenzene
(5) Flow rate: 10 mL/min
(6) Sample concentration: about 1 mg/1 mL
(7) Sample injection amount: 400 μL
(8) Detector: Differential refraction
(9) Molecular weight standard substance: standard polystyrenes (4) The Limiting Viscosity The limiting viscosity was measured in a tetralin solution at 135° C. using an Ubbelohde viscometer.

(5) The Compression Set

A small test piece prescribed in JIS K6262-1997 was compressed by 25% and continuously compressed in a gear oven at an atmospheric temperature of 120° C. for 70 hours using a compression device. After the elapse of 70 hours, the compression of the small test piece was released at an atmospheric temperature of 23° C. and the recovery rate of the test piece was measured. A lower value thereof means a more excellent heat resistance.

(6) The Hardness

Test pieces of dumbbell No. 3 prescribed in JIS K6253-1997 were cut out from a vulcanized sheet. Four sheets of the test pieces were stacked to make a measurement sample. The measurement sample was measured for the hardness at an atmospheric temperature of 23° C. using an automatic hardness tester (RH-105A, made by EXCEL Inc.) equipped with a durometer of type A. A higher value thereof means a higher hardness.

(7) The Strength

A test piece of dumbbell No. 3 prescribed in JIS K6251-1993 was cut out from a vulcanized sheet. The test piece was measured for the tensile strength under the test conditions of an atmospheric temperature of 23° C. and a tensile rate of 500 mm/min using a tensile tester (QUICK READER P-57, made by Ueshima Seisakusho Co., Ltd.). A higher value thereof means a more excellent strength.

Example 1

(The Preparation of a Copolymer Rubber Composition)

Hexane, ethylene and propylene were fed at respective rates of 1.007 kg/(hr·L), 34.4 g/(hr·L) and 90.5 g/(hr·L) per unit time and per unit polymerization tank volume to a stainless steel first polymerization tank equipped with a stirrer. VOCl$_3$ and ethanol were mixed and stirred at respective rates of 42.5 mg/(hr·L) and 20.4 mg/(hr·L) (VOCl$_3$/ethanol=$\frac{1}{1.8}$ (molar ratio)) in a line mixer, and thereafter, the mixture was fed to the polymerization tank. Further, ethylaluminum sesquichloride (EASC) and hydrogen were fed at respective rates of 242.5 mg/(hr·L) and 0.02 NL/(hr·L) to the polymerization tank. Further, 5-ethylidene-2-norbornene was fed at a rate of 4.0 g/(hr·L) to the polymerization tank. The temperature of the polymerization tank was held at 46° C. In the polymerization tank, a copolymer rubber was produced at a rate of 48 g/(hr·L) per unit time and per unit polymerization tank volume. The ethylene unit amount/the propylene unit amount (molar ratio) of the copolymer rubber was 0.66/0.34; and the iodine value was 13.6 (g/100 g polymer).

The polymerization solution extracted from the first polymerization tank was fed to a stainless steel second polymerization tank having the same volume as that of the first polymerization tank and equipped with a stirrer. Hexane and ethylene were fed at respective rates of 565 g/(hr·L) and 29.4 g/(hr·L) per unit time and per unit polymerization tank volume. VO(O(iso-C$_3$H$_7$))$_{0.8}$Cl$_{2.2}$ was fed at a rate of 12.5 mg/(hr·L) to the second polymerization tank. Further, ethylaluminum sesquichloride (EASC) and hydrogen were fed at respective rates of 43.5 mg/(hr·L) and 0.14 NL/(hr·L) to the polymerization tank. The temperature of the polymerization tank was held at 46° C.

The polymerization solution extracted from the second polymerization tank was analyzed, revealing that the production amount of a copolymer rubber composition (hereinafter, referred to as EPDM-A) was 70 g/(hr·L) per unit time and per unit polymerization tank volume; the ethylene unit amount/the propylene unit amount (molar ratio) of the copolymer rubber composition was 0.72/0.28; the iodine value was 9.9 (g/100 g polymer); the limiting viscosity was 2.2 dL/g and the molecular weight distribution was 5.4.

It was revealed that in the second polymerization tank, a copolymer rubber was produced at a rate of 22 g/(hr·L) per unit time and per unit polymerization tank volume; the ethylene unit amount/the propylene unit amount (molar ratio) of the copolymer rubber was 0.86/0.14; and the iodine value was 1.8 (g/100 g polymer).

(The Compounding of Additives)

Step (1)

100 parts by weight of EPDM-A, 5 parts by weight of zinc oxide (active zinc white AZO, made by Seido Chemical Industry Co., Ltd.), 1 part by weight of stearic acid, 100 parts by weight of SRF carbon black (Asahi 50HG, made by Asahi Carbon Co., Ltd.), 50 parts by weight of FEF carbon black (Asahi 60G, made by Asahi Carbon Co., Ltd.), 20 parts by weight of calcium carbonate (Whiton SB, made by Shiraishi Calcium Kaisha, Ltd.) and 85 parts by weight of a process oil (Diana PS430, made by Idemitsu Kosan Co., Ltd.) were kneaded in a Banbury mixer to obtain a kneaded material. In the kneading, the temperature of the Banbury mixer at the start of the kneading was set at 80° C.; the rotation frequency of the rotor, at 60 rpm; and the kneading time, for 5 min Step (2)

The above-mentioned kneaded material, and 5 parts by weight of calcium oxide (Vesta PP, made by Inoue Calcium Corp.), 0.7 parts by weight of tetramethylthiuram disulfide (Rhenogran TMTD-80, made by Rhein Chemie Rheinau GmbH), 2.5 parts by weight of N-cyclohexylbenzothiazole sulfenamide (Rhenogran CSB-80, made by Rhein Chemie Rheinau GmbH) and 1 part by weight of sulfur with respect to 100 parts by weight of EPDM-A in the kneaded material were mixed in an 8-inch open roll at a roll temperature of 50° C. to obtain a copolymer rubber composition.

(The Preparation of a Vulcanized Molded Product)

The copolymer rubber composition obtained in step (2) was compression molded at 160° C. for 20 min to simultaneously perform molding and vulcanization to fabricate a vulcanized sheet of 2 mm in thickness, and a small test piece prescribed in JIS K6262-1997. The evaluation results of the sheet and the test pieces are shown in Table 1.

Comparative Example 1

Hexane, ethylene and propylene were fed at respective rates of 1.007 kg/(hr·L), 29.0 g/(hr·L) and 104.0 g/(hr·L) per unit time and per unit polymerization tank volume to a stainless steel first polymerization tank equipped with a stirrer. VOCl$_3$ and ethanol were mixed and stirred at respective rates of 33.6 mg/(hr·L) and 16.1 mg/(hr·L) (VOCl$_3$/ethanol=1/1.8 (molar ratio)) in a line mixer, and thereafter, the mixture was fed to the polymerization tank. Further, ethylaluminum sesquichloride (EASC) and hydrogen were fed at respective rates of 191.7 mg/(hr·L) and 0.023 NL/(hr·L) to the polymerization tank.

Further, 5-ethylidene-2-norbornene was fed at a rate of 2.0 g/(hr·L) to the polymerization tank. The temperature of the polymerization tank was held at 46° C.

In the polymerization tank, a copolymer rubber was produced at a rate of 34 g/(hr·L) per unit time and per unit polymerization tank volume. The ethylene unit amount/the propylene unit amount (molar ratio) of the copolymer rubber was 0.67/0.33; the iodine value was 9.2 (g/100 g polymer); the limiting viscosity was 2.2 dL/g; and the molecular weight distribution was 3.4.

A vulcanized sheet and a small test piece were fabricated as in "the compounding of additives" and "the preparation of a vulcanized molded product" in Example 1, except for using EPDM-B in place of EPDM-A. The evaluation results of the sheet and the test piece are shown in Table 1.

Comparative Example 2

A vulcanized sheet and a small test piece were fabricated as in Comparative Example 1, except for that 100 parts by weight of EPDM-B, 5 parts by weight of a low-density polyethylene (Sumikasen G801, made by Sumitomo Chemical Co., Ltd.), 5 parts by weight of zinc oxide (active zinc white AZO, made by Seido Chemical Industry Co., Ltd.), 1 part by weight of stearic acid, 100 parts by weight of SRF carbon black (Asahi 50HG, made by Asahi Carbon Co., Ltd.), 50 parts by weight of FEF carbon black (Asahi 60Q made by Asahi Carbon Co., Ltd.), 20 parts by weight of calcium carbonate (Whiton SB, made by Shiraishi Calcium Kaisha, Ltd.) and 85 parts by weight of a process oil (Diana PS430, made by Idemitsu Kosan Co., Ltd.) were kneaded in a Banbury mixer to obtain a kneaded material, in "the compounding of additives" in Comparative Example 1. The evaluation results of the sheet and the test piece are shown in Table 1.

Comparative Example 3

A vulcanized sheet and a small test piece were fabricated as in

Comparative Example 2, except for altering the compounding amount of the low-density polyethylene to 10 parts by weight in Comparative Example 2. The evaluation results of the sheet and the test piece are shown in Table 1.

Comparative Example 4

A vulcanized sheet and a small test piece were fabricated as in Comparative Example 2, except for altering the compounding amount of the low-density polyethylene to 20 parts by weight in Comparative Example 2. The evaluation results of the sheet and the test piece are shown in Table 1.

TABLE 1

| | Example | Comparative Example | | | |
|---|---|---|---|---|---|
| | 1 | 1 | 2 | 3 | 4 |
| Compounding (parts by weight) | | | | | |
| Step (1) | | | | | |
| EPDM-A | 100 | | | | |
| EPDM-B | | 100 | 100 | 100 | 100 |
| Zinc Oxide | 5 | 5 | 5 | 5 | 5 |
| Stearic Acid | 1 | 1 | 1 | 1 | 1 |
| SRF Carbon Black | 100 | 100 | 100 | 100 | 100 |
| FEF Carbon Black | 50 | 50 | 50 | 50 | 50 |
| Calcium Carbonate | 20 | 20 | 20 | 20 | 20 |

TABLE 1-continued

|  | Example | Comparative Example | | | |
|---|---|---|---|---|---|
|  | 1 | 1 | 2 | 3 | 4 |
| Process Oil | 85 | 85 | 85 | 85 | 85 |
| Low-Density Polyethylene | — | — | 5 | 10 | 20 |
| Step (2) | | | | | |
| Calcium Oxide | 5 | 5 | 5 | 5 | 5 |
| Tetramethylthiuram Disulfide | 0.7 | 0.7 | 0.7 | 0.7 | 0.7 |
| N-Cyclohexylbenzothiazole Sulfenamide | 2.5 | 2.5 | 2.5 | 2.5 | 2.5 |
| Sulfur | 1.0 | 1.0 | 1.0 | 1.0 | 1.0 |
| Evaluations | | | | | |
| Hardness (Duro A) | 76 | 72 | 73 | 74 | 76 |
| Strength (MPa) | 12.4 | 11.5 | 10.7 | 10.4 | 10.0 |
| Compression Set (%) | 18 | 14 | 17 | 19 | 24 |

What is claimed is:

1. A method for producing a copolymer rubber composition comprising:
    a copolymer rubber (1); and
    a copolymer rubber (2), as a rubber component,
    wherein the content of the copolymer rubber (1) is 60% by weight or more and 75% by weight or less, and the content of the copolymer rubber (2) is 40% by weight or less and 25% by weight or more, based on 100% by weight of the total of the copolymer rubber (1) and the copolymer rubber (2); and the difference in iodine value between the copolymer rubber (1) and the copolymer rubber (2) is 5 or more and 30 or less, and
    wherein,
    the copolymer rubber (1) is an ethylene-α-olefin-nonconjugated polyene copolymer rubber wherein the content of a monomer unit based on ethylene is 50 mol % or more and 70 mol % or less; the content of a monomer unit based on α-olefin is 50 mol % or less and 30 mol % or more (provided that the total of the monomer unit based on ethylene and the monomer unit based on α-olefin is 100 mol %); and the iodine value is 10 or more and 30 or less, and
    the copolymer rubber (2) is an ethylene-α-olefinic copolymer rubber wherein the content of a monomer unit based on ethylene is more than 70 mol % and 95 mol % or less; the content of a monomer unit based on α-olefin is less than 30 mol % and 5 mol % or more (provided that the total of the monomer unit based on ethylene and the monomer unit based on α-olefin is 100 mol %); and the iodine value is 0 or more and 8 or less,
    which method comprises
    manufacturing one of the copolymer rubber (1) and the copolymer rubber (2) in a first reaction tank, feeding the one copolymer rubber manufactured in the first reaction tank to a second reaction tank, and manufacturing the other copolymer rubber in the second reaction tank in the presence of the one copolymer rubber, wherein the two tanks are coupled in series; and
    wherein the polymerization catalysts used in manufacturing of the copolymer rubber (1) are those containing a vanadium compound selected from the group consisting of $VO(OC_2H_5)Cl_2$, $VO(OC_2H_5)_{0.5}Cl_{2.5}$, $VO(OC_2H_5)_{0.8}Cl_{2.2}$, and $VO(OC_2H_5)_{1.8}Cl_{1.2}$ and an organoaluminium compound selected from the group consisting of $(C_2H_5)_2AlCl$, $(n-C_2H_5)_{1.5}C_2H_5AlCl_2$ and $(C_2H_5)_3Al_2Cl_3$ as polymerization catalyst components;
    and
    wherein the polymerization catalyst used in manufacturing of the copolymer rubber (2) are those having a vanadium compound selected from the group consisting of $VO(O(iso-C_3H_7))Cl_2$, $VO(O(iso-C_3H_7))_{0.5}Cl_{2.5}$, $VO(O(iso-C_3H_7))_{1.5}Cl_{0.5}$ and $VO(O(iso-C_3H_7))_{0.8}Cl_{2.2}$ and the organoaluminium compound selected from the group consisting of $(C_2H_5)_2AlCl$, $(n-C_2H_5)_{1.5}C_2H_5AlCl_2$, and $(C_2H_5)_3Al_2Cl_3$ as polymerization catalyst components.

2. The method according to claim 1, wherein the α-olefin of copolymer rubber (1) and of copolymer rubber (2) is a propylene, and the nonconjugated polyene is at least one compound selected from the nonconjugated polyene group consisting of 5-ethylidene-2-norbornene, dicyclopentadiene and 5-vinyl-2-norbornene.

3. The method according to claim 1, wherein a molecular weight distribution of the rubber component comprising the copolymer rubber (1) and the copolymer rubber (2) is 3 or more and 7 or less.

4. The method according to claim 1, wherein ethylene, an α-olefin, a nonconjugated polyene, a solvent, hydrogen and a polymerization catalyst are fed to a first reaction tank to manufacture the copolymer rubber (1) in the first reaction tank; and the copolymer rubber (1) manufactured in the first reaction tank, ethylene, an α-olefin, a solvent, hydrogen and a polymerization catalyst are fed to a second reaction tank to manufacture copolymer rubber (2) in the second reaction tank.

5. A method according to claim 1, which further comprises molding and vulcanizing the copolymer rubber composition with additives to produce a vulcanized molded product.

6. A method according to claim 5, wherein the vulcanized molded product has a density of 0.7 kg/L or more and 1.1 kg/L or less, and a hardness of 30 to 100.

7. A method according to claim 5, which further comprises producing an automotive sealant comprising the vulcanized molded product as a solid member.

8. The method according to claim 1, wherein ethylene, an α-olefin, a solvent, hydrogen and a polymerization catalyst are fed to a first reaction tank to manufacture the copolymer rubber (2) in the first reaction tank; and the copolymer rubber (2) manufactured in the first reaction tank, ethylene, an α-olefin, a nonconjugated polyene, a solvent, hydrogen and a polymerization catalyst are fed to a second reaction tank to manufacture copolymer rubber (1) in the second reaction tank.

* * * * *